No. 680,557. Patented Aug. 13, 1901.
H. H. WILSON.
CHALK LINE HOLDER.
(Application filed Apr. 18, 1901.)
(No Model.)
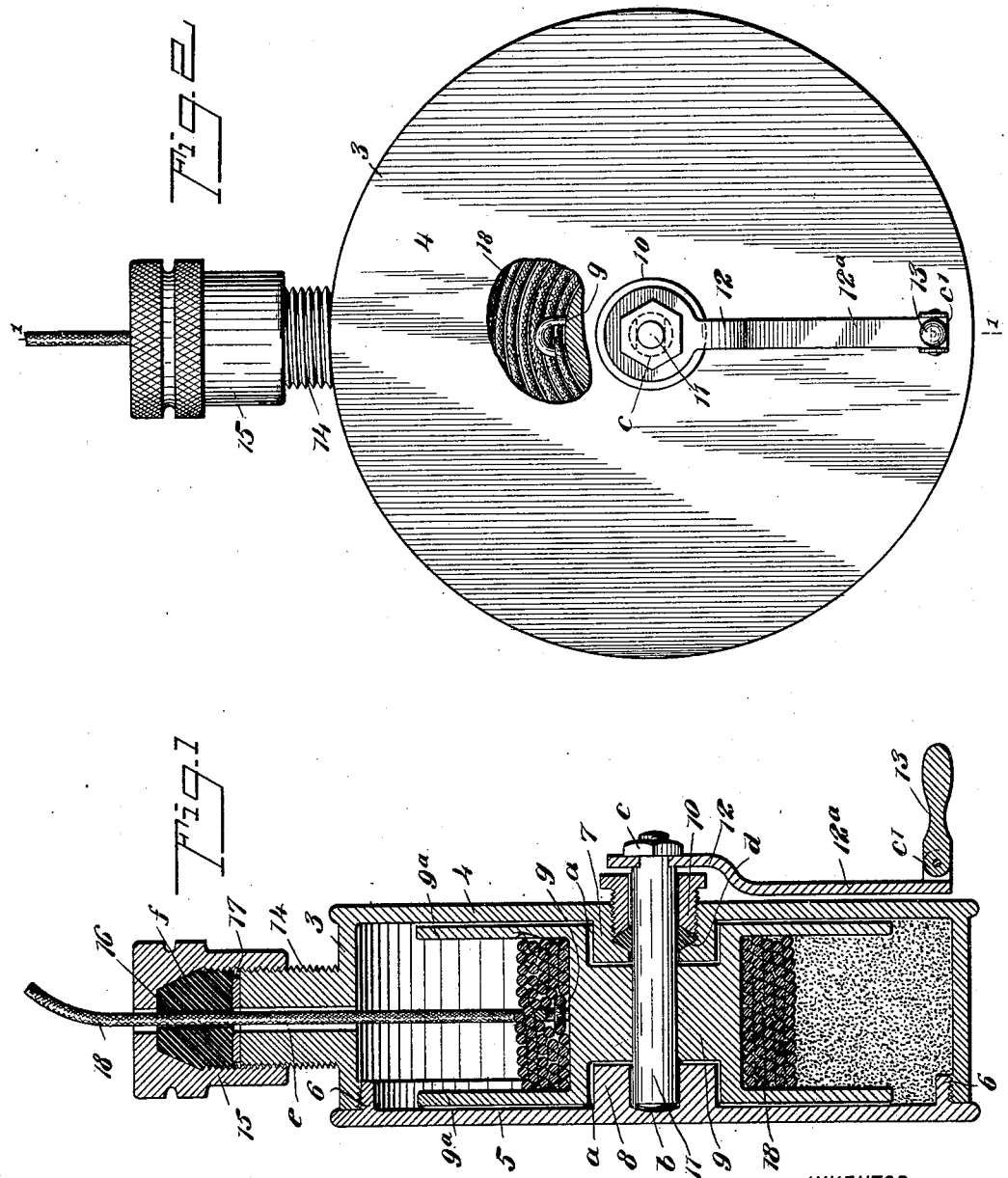
WITNESSES:
INVENTOR
Harry H. Wilson
BY 
ATTORNEYS

UNITED STATES PATENT OFFICE.

HARRY H. WILSON, OF NASEL, WASHINGTON.

CHALK-LINE HOLDER.

SPECIFICATION forming part of Letters Patent No. 680,557, dated August 13, 1901.

Application filed April 18, 1901. Serial No. 56,419. (No model.)

*To all whom it may concern:*

Be it known that I, HARRY H. WILSON, a subject of the King of Great Britain, and a resident of Nasel, in the county of Pacific and State of Washington, have invented a new and Improved Chalk-Line Holder, of which the following is a full, clear, and exact description.

This invention has for its object to provide a chalk-line holder in the form of a sealable casing, holding a coating for the line, a reel in the casing, a line which is wrapped on the reel by operating a crank-handle exterior of the casing, the line being held in contact with the coating in the casing, and a device through which the line may be drawn from the casing to remove surplus coating therefrom.

The invention consists in the novel construction and combination of parts, as is hereinafter described, and defined in the appended claims.

Reference is to be had to the accompanying drawings, forming a part of this specification, in which similar characters of reference indicate corresponding parts in both figures.

Figure 1 is a transverse sectional view substantially on the line 1 1 in Fig. 2, and Fig. 2 is a side view of the improvement broken away to show interior details.

The casing of the device comprises a circular body 3, whereon one flat side wall 4 is formed or affixed immovably. The opposite and parallel side wall 5 is provided with a circular flange 6, concentric with its edge, and said flange is exteriorly threaded to adapt it to have screwed engagement with a thread formed on the inner surface of the body 3 at and near its free edge.

A boss 7 is formed centrally on the inner side of the fixed casing-wall 4, and a similar boss 8 is formed oppositely on the detachable side wall 5. A reel, consisting of a cylindrical barrel 9 and two circular flanges $9^a$, which are respectively formed or secured at opposite ends of the barrel, has such dimensions as adapt it to occupy the casing, and to facilitate the introduction of the reel within the casing each end of the barrel is circularly cupped, as indicated at *a a* in Fig. 1. The cups *a* being central and opposite each other it will be seen that the true cylindrical bosses 7 8 may be readily introduced therein, and said bosses are of such relative dimensions as to adapt them to fit loosely in the cups, as indicated in Fig. 1.

In one side wall of the casing, preferably the fixed wall 4, a central circular recess is formed which extends into the boss 7, and said recess is interiorly threaded to receive the threaded thimble 10, that is radially flanged on its outer end, and together with the recess it partially occupies provides a packing-box. The thimble 10 and inner end walls of the bosses 7 8 are axially perforated. The perforation in the boss 8 does not extend through the same, but forms a socket *b* of suitable depth.

A spindle 11 is provided for the support and rotatable movement of the reel, which is mounted upon and secured thereto intermediately of the end portions of the spindle, one end thereof having loose engagement within the socket *b* in the boss 8. The opposite and longer end portion of the spindle projects through the packing-box carried by the boss 7 and outside of the thimble 10 to receive the laterally-perforated end of the crank-arm 12, which is preferably held securely on the spindle by a nut *c*.

Upon the outer end of the arm 12 a handle 13 is hinged at *c'* in a manner which permits said handle to fold upon the arm or be adjusted at a right angle thereto for service, and the crank-arm may with advantage have its main portion $12^a$, that extends beyond the packing-box, offset to dispose it close to the side wall 4, so that when folded the handle 13 will not project outside of the portion 12 of the crank-handle, which is secured upon the end of the spindle 11.

Sufficient space is afforded in the recess formed in the boss 7 to permit the introduction of a suitable packing-joint *d* between the bottom of the recess and inner end of the thimble or packing-gland 10, and it will be evident that this provision will permit the packing to be properly compressed around the spindle 11 and prevent leakage of any liquid matter that may be introduced within the casing of the device. Upon the casing-body 3 a threaded nipple 14 is formed or affixed, preferably at the transverse center of said body, an axial perforation e extending through the nipple. A cap-nut 15 of proper length is screwed upon the nipple 14, and within said cap-nut a packing-block 16, preferably of gum, is fitted. As shown in Fig. 1, the side wall of the bore in the cap-nut 15 near the bottom of said bore is in cone form, contracting gradually to the bottom thereof, and the elastic packing-block 16 is shaped to fit closely against said coniform portion f of the bore of the cap-nut. Between the packing-block 16 and the outer end of the nipple 14 a flat metal washer 17 is located, and said washer, together with the packing-block and end wall of the cap-nut 15, are perforated in alinement with the perforation e in the nipple 14.

Upon the reel-barrel 9 one end of the flexible marking-line 18 is secured upon a staple g, that projects from the barrel, and the line, which is of a proper length for effective service, is closely wrapped upon the reel, as represented in Fig. 1, the free end of the line being drawn through the perforation e and alined perforations in the washer 17, block 16, and end wall of the nut 15, so that it may be grasped and pulled upon for removal of the line from the reel when the line is to be used.

For efficiency the perforation in the packing-block 16 should be of a diameter to adapt the line 18 to neatly fit therein free to move in either direction.

It will be seen that if the cap-nut 15 after its normal adjustment on the nipple 14 is screwed one or more turns down upon the nipple 14 this will correspondingly compress the coniform end portion of the packing-block 16 and will slightly reduce the diameter of the perforation therein, so as to clamp the block on the marking-line sufficiently to remove excess of liquid therefrom if a liquid coating is provided for the line.

To prepare the improved line-holder for service with the line in position as shown in Fig. 1, the side wall 5 is removed, and in case chalk is to be used for coating the line a sufficient quantity of such material in powdered condition is introduced within the casing, and then the side wall 5 is replaced.

Evidently the direct contact of the powdered chalk with the outer turns of the line on the reel will profusely coat the line with the chalk, and when the line is drawn out of the holder for use in the usual way to produce a guiding-mark on timber or the like the act of drawing the line through the packing-block 16 will remove any excess of coating on the line, preventing waste of the chalk and adapting the coating of the line to make a better impression on the timber or board than would result if the line were excessively coated.

It is found by experience that dry powdered chalk will answer well for producing lines upon dry timber or boards, but that if working on such material is conducted in places where there is exposure to rain or snow the chalk-marks are obliterated by excessive wetting of the same and require to be renewed.

To adapt the improved line-holder for the coating of the line with a durable impressing material in liquid form, said holder has been specially constructed, as hereinbefore described, to prevent leakage of such liquid, which may consist of any suitable thin liquid paint, such as lampblack mixed with turpentine or red lead and oil.

The use of waterproof-coating liquid for the line will permit the lining operation to be effected on wet timber, boards, or stone blocks that are to be afterward lined for dressing, and it will be seen that lines made with a liquid waterproof coating that is contained in the line-holder will resist moisture and remain visible as long as is necessary.

The use of liquid coating material for the marking-line is very conveniently effected by means of the improved line-holder, as such liquid coating may be introduced within the casing of the line-holder by removal of its detachable side wall, that when replaced provides a liquid-tight receptacle which may without danger of leakage be carried in the pocket until needed for use.

It will be understood that if a liquid coating is supplied for saturation of the marking-line 18 a proper adjustment of the cap-nut 15, as already described, will remove excessive moisture therefrom as it is drawn out of the line-holder and leave the line properly coated to permit a distinct and durable imprint to be made on the material that is to be lined either in a wet or dry condition.

Having fully described my invention, I claim as new and desire to secure by Letters Patent—

1. A line-holder, comprising a circular casing having a removable side wall, central bosses on the inner faces of the casing side walls, one of said bosses having a central socket and the other boss a central perforation, a packing-box on the centrally-perforated side wall, a reel in the casing, having a central barrel and radial flanges at its ends, said barrel being cupped in its ends to receive the bosses, a spindle extended through the packing-box, the perforation in the side wall and into the socket, said spindle being secured in a central perforation in the reel-barrel, a crank-handle on the outer end of the spindle, and a line-clamping device on the peripheral wall of the casing.

2. In a line-holder of the character described, the line-clamping device, comprising a threaded nipple projected from the peripheral wall of the holder-casing, a cap-nut screwed upon the nipple and having the inner portion of its bore rendered coniform, and an elastic packing in the cap-nut, said nipple, packing and head wall of the nut being perforated for passage of a marking-line therethrough.

In testimony whereof I have signed my name to this specification in the presence of two subscribing witnesses.

HARRY H. WILSON.

Witnesses:
 MILDRED KLINT,
 A. M. SMITH.